Oct. 7, 1969  A. FISCHER  3,471,183

CONNECTING ARRANGEMENT

Filed Feb. 2, 1968  2 Sheets-Sheet 1

Inventor:
Artur Fischer
By Michael S Striker
Attorney

United States Patent Office 3,471,183
Patented Oct. 7, 1969

3,471,183
CONNECTING ARRANGEMENT
Artur Fischer, 133 Grunmettstetterstrasse, 7241
Tumlingen, Kreis Freudenstadt, Germany
Filed Feb. 2, 1968, Ser. No. 702,646
Claims priority, application Germany, Mar. 22, 1967,
F 51,899
Int. Cl. F16b 1/00, 7/00
U.S. Cl. 287—189.36                     11 Claims

ABSTRACT OF THE DISCLOSURE

A wall has an exposed surface and an aperture extending inwardly therefrom. A member to be supported with spacing from this wall is located spaced from the exposed surface thereof and is provided with a hole in registry with the aperture. An expansible sleeve is received in the aperture and has a portion extending into the hole of the member. An expanding member extends into the interior of the sleeve expanding the same into firm engagement with the wall, and holding the member on the sleeve. An abutment is provided on the sleeve outwardly spaced from the exposed surface of the wall and prevents the member to be supported from approaching the exposed surface of the wall beyond a predetermined distance.

BACKGROUND OF THE INVENTION

The present invention is concerned generally with connecting arrangements, and more particularly with an arrangement for connecting a supported member to a supporting member with spacing from the latter.

It is of course well known to secure one member to another. It is also well known to secure panels and similar objects to the exposed surface of a wall or other supporting structure. However, in modern architecture it is becoming more and more common to suspend such panels or plate-shaped members from a supporting wall or structure at a distance from the surface which is to be covered. This is done for various reasons, including the fact that different visual effects can be obtained by spacing different plates at different distances from the exposed surface.

The apparently simplest way to connect such members, which hereafter for the sake of convenience will be identified as plates, to the supporting structure which hereafter will be identified as the wall, is to insert spacing members between the respective plates and the wall. This, however, is a relatively time-consuming and expensive procedure, not only because of the costs involved for the material needed to manufacture the spacing elements, but also because the installation of such spacing elements intermediate plates and the wall is fairly difficult and time consuming. In an attempt to provide an improvement over this procedure special connecting arrangements have been developed which permit securing of the plates to the wall by means of expansion anchors. These arrangements rely on use of specially developed screws which permit not only the expansion of an expansion anchor sleeve but also the adjustment of the distance of the plate from the wall. Such screws are provided with two different screw threads of different diameters, one of which serves to expand the expansion anchor sleeve whereas the other screw thread serves for securing the plate to the connecting arrangement. The outer diameter of this second screw thread is somewhat larger than the maximum outer diameter of the expansion anchor sleeve which is inserted in the hole in the wall. To effect the connection by means of this assembly, the hole in the wall is placed into registry with an aperture in the element or plate which is to be connected to the wall. Thereupon, the leading end of the expansion screw is lightly threaded into the expansion anchor sleeve and they are together inserted through the aperture in the plate and into the hole in the wall. The expansion anchor sleeve is advanced in the hole until the screw threads, provided at the trailing end of the expansion screw, that is the second screw threads mentioned above, are ready to "bite" into the material of the plate in which the aperture is formed. Now the screw is turned in a sense threading it deeper into the expansion anchor sleeve whereby the latter is expanded by the first screw thread at the leading end of the screw whereas the second screw thread provided at the trailing end of the screw is threaded into the material surrounding the aperture in the plate. Once the screw has been inserted to the extent necessary to effect proper expansion of the expansion sleeve into engagement with the wall, the plate is supported on the exposed surface of the wall for spacing from the surface.

However, this known approach suffers from some disadvantages, particularly from the fact that, while the plate can be supported with spacing from the exposed surface of the wall, a variation of this spacing subsequent to expansion of the expansion anchor sleeve is difficult if not impossible. Thus, variations to compensate for irregularity in the surface of the wall, to compensate for irregularity for the positioning of adjacent ones of the plates with reference to one another, or simply to permit the creation of desired visual effects by positioning adjacent plates at different distances from the surface of the wall, becomes difficult if not completely impossible. Clearly, some compensation is possible before the expansion anchor sleeve is expanded into firm engagement with the wall, simply by sliding the sleeve in the hole in the wall so that it extends into this hole to a greater or lesser degree. However, once proper expansion of the sleeve has been effected, no further adjustment of this type is possible. Furthermore, the type of expansion screw which is needed for this arrangement is a very special construction which is relatively expensive to manufacture and which cannot be manufactured in large and therefore economical series-production because it can be used only for this particular purpose and cannot be employed for other applications.

It is thus a general object of the present invention to overcome the disadvantages of such types of connections as have been outlined above, and to provide desirable improvements.

A more particular object of the invention is to provide a connection of the type in question in which the need for an expensive specially manufactured and configurated expanding screw or element no longer exists.

An additional object of the present invention is to provide such an arrangement wherein the support plate can be positioned at a precisely predetermined distance from the exposed surface of the wall on which it is supported.

A further object of the invention is to provide an arrangement of the type in question wherein the spacing of the supported plate from the supporting wall can be varied at will and within a wide range of possibilities.

SUMMARY OF THE INVENTION

In accordance with one feature of my invention I provide an arrangement of the type under discussion which comprises a support having an exposed surface and an aperture extending into inwardly from this exposed surface. A supported structure is provided which has opposite sides respectively facing towards and away from the exposed surface of the support, and this supported structure is provided with a hole in registry with the aperture of the support. An anchoring arrangement for mounting the supported structure on the support comprises an expansible sleeve having a leading portion provided with a front end and being received in the aperture of the support, and a trailing portion which extends outwardly from the exposed surface and which is received in the hole of the supported structure. The anchoring arrangement further comprises an elongated expanding member having one portion which is received in and expands the leading portion of the sleeve into firm engagement with the support, and another portion which is at least partially received in the hole of the structure. Abutment means provided on the sleeve engages that side of the supported structure which faces towards the surface of the support and is operative for maintaining the structure in proper position on the sleeve and at a predetermined distance from the exposed side of the support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
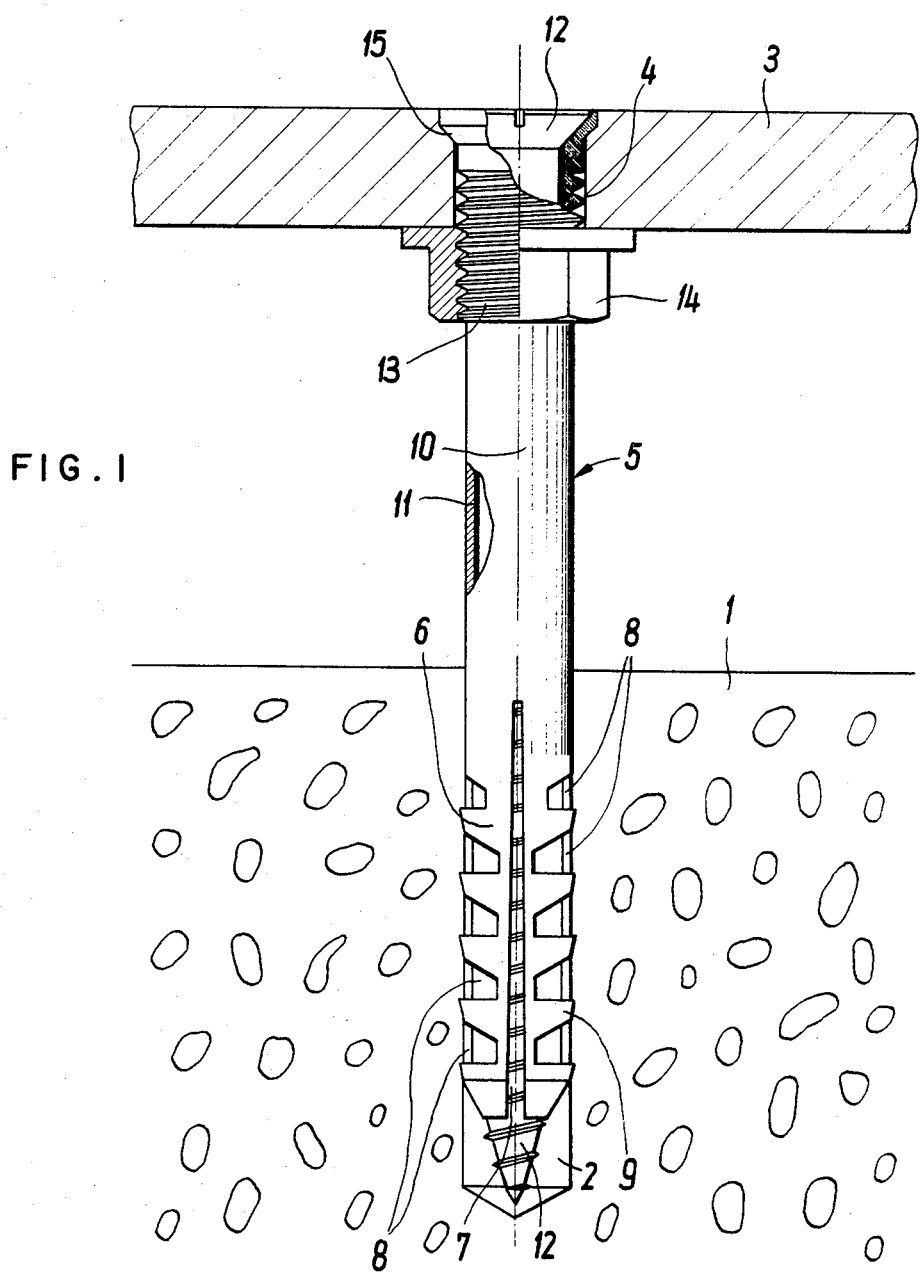
FIG. 1 illustrates one exemplary embodiment of the invention in partially sectioned view.

Discussing now the drawing in detail, and firstly FIG. 1, it will be seen that reference numeral 1 generally identifies a masonry structure, such as a wall, which serves as support for a plate or panel element 3. An exposed surface of the wall 1 is provided with an aperture 2 and the panel or plate 3 is provided with a hole 4 which is placed into registry with the aperture 2. An elongated expansion anchor sleeve 5, which advantageously may consist of synthetic plastic material or of other suitable material is introduced with its front or leading end portion 6 into the aperture 2 of the wall 1. The leading portion 6 is provided with an axially extending slot 7 which extends towards but short of the trailing end of the sleeve 5. Advantageously, the front or leading portion 6 of the sleeve 5 is provided with alternating recesses 8 and projections 9 which may be of a configuration other than that illustrated in the drawing and whose purpose it is to "bite" into the surrounding material of the wall 1 when the leading portion 6 of the sleeve 5 is radially expanded.

The trailing portion of the sleeve 5 is identified with reference numeral 10 and extends with its rear end into the hole 4 of the member 3. The sleeve 5 is provided with a central passage 11 extending from its rear end towards its front end and, although this is not visible in the illustration, this passage tapers or converges in its cross-section in the direction from the rear end towards the front end of the sleeve 5. An expanding element is provided in form of a screw 12 which, when threaded into and through the passage 11, will affect radial expansion of the slotted leading portion 6 of the sleeve 5, in the manner illustrated in the drawing, thus anchoring the sleeve 5 in the aperture 2 of the wall 1. The screw 12 may be provided, as illustrated, with a helical screw thread, that is it may be a wood screw, or it may be provided with a metric screw thread.

The trailing portion 10 of the sleeve 5 is provided in the region of the rear end of the sleeve with an external screw thread 13 which meshes with an internal screw thread of a nut 14, which latter can be moved toward and away from the front end of the sleeve 5 simply by being turned with reference to the sleeve. The nut 14 constitutes an abutment means for the member 3, it being clear that the member 3 can approach the exposed surface of the wall 1 no closer than permitted by the nut 14. Evidently, the distance of the member 3 from the exposed surface of the wall 1 can be adjusted simply by adjusting the positioning of the nut 14 with reference to the front end of the sleeve 5 and therefore with reference to the exposed surface of the wall 1 in whose aperture 2 the sleeve 5 is anchored.

In FIG. 1 the extreme rear end of the sleeve 5 is provided with a conically diverging head portion 15 which is received in a complementarily configurated section of the hole 4 of the member 3, it being clear that when the sleeve 5 is thus configurated it is necessary that the material of the sleeve be elastically deflectable, at least in the region of the head portion 15, so that this head portion can be introduced through the portion of the hole 4 having the smaller cross-section, it being evident that in the illustrated embodiment the rear end of the sleeve 5 is introduced into the hole 4 from the concealed side of the member 3, namely from that side which faces the exposed surface of the wall 1. The head of the screw 12 is snugly received within this conically diverging head portion 15 of the sleeve 5, pressing the head portion 15 against the material of the member 3, whereby the member 3 is tightly held between the head portion 15 and the nut 14. Evidently, adjustment of the distancing of the member 3 from the exposed surface of the wall 1 can be made by adjusting the positioning of the nut 14, as already pointed out before.

It is clear that with this construction the need for a specially configurated and manufactured expanding screw is eliminated inasmuch as a standard wood or metal screw with helical or metric thread can be provided. This results in considerable economies because such standard screws are of course manufactured at relatively low expense and at extremely large quantities. At the same time, the adjustment of the positioning of the member 3 with reference to the exposed surface of the wall 1 is very simple with this embodiment and can be effected at any time and without any need for shifting the sleeve 5 in the aperture 2 of the wall 1.

Figure 2:
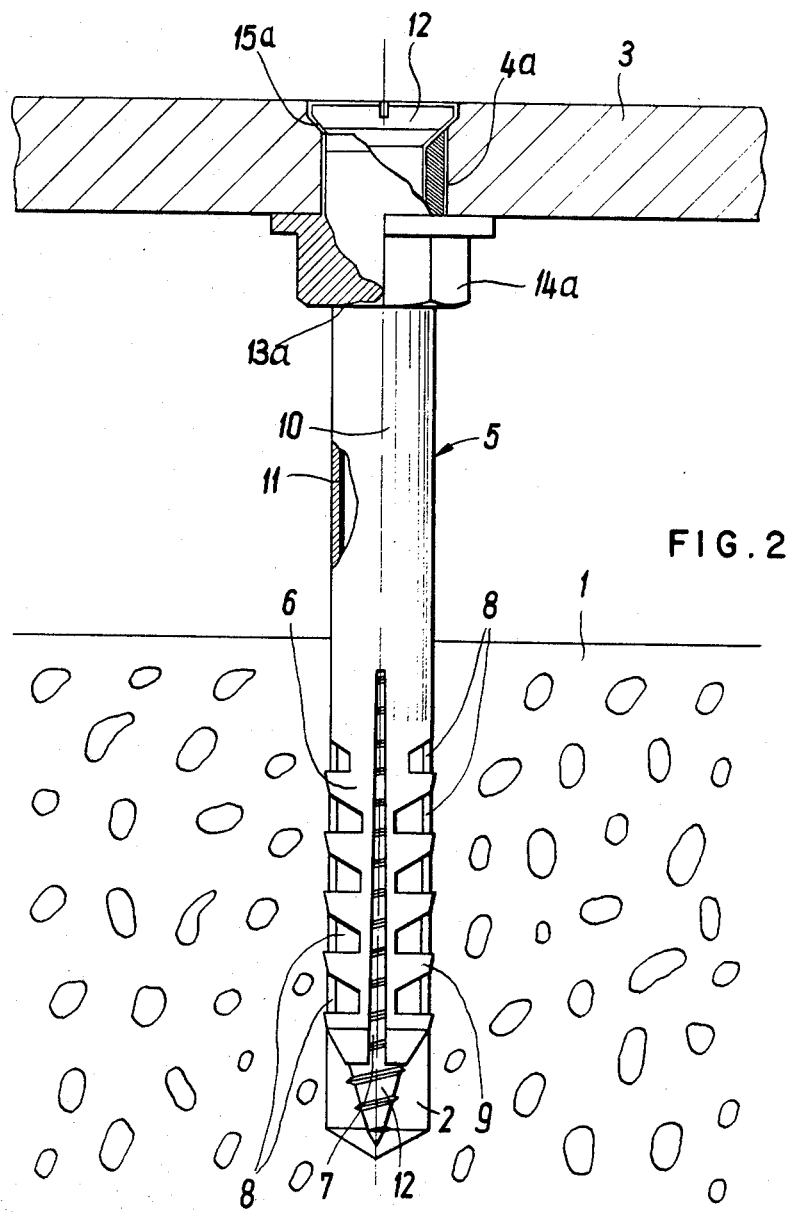
FIG. 2 illustrates another embodiment in a view similar to FIG. 1.

Of course, other embodiments such as that ilustrated in FIG. 2 can be provided. Thus, instead of the screw thread 13 and the nut 14 threaded thereunto, the abutment means can be provided in form of a projection 14a extending transversely of the elongation of the sleeve 5 and reference numeral 13a indicates that it is integral with the trailing portion 10 thereof. In this case, in which the abutment means is not adjustable in the longitudinal direction of sleeve 5 changing of the position of the member 3 with reference to the exposed surface of the wall 1 is effected simply by inserting the leading portion 6 of the sleeve 5 into the aperture 2 of the wall 1 to a greater or lesser degree it being of course evident that this shifting must be carried out before the expansion sleeve 5 is expanded to such an extent as to preclude further movements of this type. It will also be clear that the head portion 15 shown in FIG. 1 can be eliminated, in which case the head of the screw 12 will press in the recess 15a against the material of the member 3 and will maintain the same in abutment with the abutment means 14a, or an analogous member, in the same manner as illustrated in the drawing.

The provision of the external screw thread on the sleeve 5 as illustrated in FIG. 1 is, of course, very simple inasmuch as if the sleeve 5 is made from synthetic plastic material, the screw thread 13 can be formed on the sleeve during manufacture of the latter, for instance by means of injection molding.

An additional avantage of the present invention over those arrangements which are know from the art is the fact that the expansion member, namely the screw 12 or an analogous member, is completely encased within the sleeve 5 which protects it from any corrosive influences so that the customary corrosion-protecting means can be eliminated.

In accordance with a further possible embodiment of the invention the securing of the member 3 on the sleeve 5 can be effected by providing the rear end of the sleeve 5 with a head which may be of many different configurations and which will engage the member 3 on that side thereof which faces away from the wall 1. If the sleeve 5 is configurated in this manner, it is advantageous that the tight clamping of the member 3 be effected by making the abutment means movable in the manner illustrated by the member 14 in the drawing, and by effecting the clamping by moving the member 14 or an analogous abutment means into tight engagement with the concealed side of the member 3, thus pressing the latter against the head provided on the sleeve 5. In this case, the screw 12 may be replaced with a non-threaded expanding member, for instance with a cylindrical or substantially cylindrical pin whose tip may have a conical taper.

It will be evident, also, that the present invention is by no means limited to simply securing cover plates to an exposed surface of a wall of a building. Evidently, the invention is applicable in any circumstances where one member must be secured to another member with a predetermined spacing from the latter.

It will be understood that each of the elements described above, or two or more together may also find a useful application in other types of constructions, differing from the types described above.

While the invention has been illustrated and described as embodied in a connecting arrangement, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention, and, therefore, such adaptations should and are intended to be comprehended.

What is claimed as new and desired to be protected by Letters Patent is set forth in the appended claims.

I claim:

1. An arrangement of the character described, comprising a support having an exposed surface and an aperture extending inwardly therefrom; a supported structure having opposite sides facing respectively towards and away from said exposed surface and being provided with a hole in registry with said aperture; an anchoring arrangement for mounting said structure on said support comprising an expansible sleeve of constant length having a leading portion provided with a front end and being received in said aperture and an axially rigid shape-retaining trailing portion extending to said exposed surface and being received in said hole, and said anchoring arrangement further comprising an elongated expanding member having one portion received in and expanding said leading portion of said sleeve into firm engagement with said support, and another portion at least partially received in said hole of said structure; and abutment means provided on said axially rigid shape-retaining trailing portion of said sleeve, projecting outwardly from the surface of said sleeve and engaging said side of said structure facing towards said surface for maintaining said structure in position on said sleeve and at a predetermined distance from said exposed side of said support.

2. An arrangement as defined in claim 1, wherein said leading portion of said sleeve is provided with at least one slot extending from said front end in direction towards said trailing portion for facilitating expansion in response to introduction of said one portion of said expanding member.

3. An arrangement as defined in claim 1, wherein said sleeve is provided with an axial passage extending between opposite ends of said sleeve and converging in cross-sectional area in direction from said trailing portion towards said leading portion.

4. An arrangement as defined in claim 1 wherein said abutment means is integral with said sleeve.

5. An arrangement as defined in claim 1, wherein said abutment means is movable on said sleeve to a plurality of positions spaced from one another in the direction of elongation of said sleeve.

6. An arrangement as defined in claim 5, wherein said sleeve is externally screw-threaded at least in the region of said trailing portion, and wherein said means comprises an annular member provided with internal screw-threads adapted to mesh with the external screw-threads on said sleeve.

7. An arrangement as defined in claim 5, wherein at least said sleeve consists of synthetic plastic material.

8. An arrangement as defined in claim 1, wherein said trailing portion has a trailing free end, and wherein said sleeve comprises an enlargement provided in the region of said free end and adapted, when said trailing portion is received in said hole of said structure, to engage that side of said structure which faces away from said surface.

9. An arrangement as defined in claim 3, wherein said expanding member is a screw having a metric screw thread.

10. An arrangement as defined in claim 3, wherein said expanding member is a screw having a helical screw thread.

11. An arrangement as defined in claim 3, wherein said expanding member is a substantially cylindrical rod.

References Cited

UNITED STATES PATENTS 3,340,761    9/1967    Fischer _____ 85—83 X

FOREIGN PATENTS 737,206    6/1966    Canada.
531,824    8/1955    Italy.

RAMON S. BRITTS, Primary Examiner

U.S. Cl. X.R.

52—378; 85—83, 84